(12) United States Patent
Zimmerman

(10) Patent No.: US 6,886,838 B1
(45) Date of Patent: May 3, 2005

(54) EASY DUMPING CART

(75) Inventor: Felton Zimmerman, Tampa, FL (US)

(73) Assignee: Zimmco, Tampa, FL (US)

( * ) Notice: Subject to any disclaimer, the term of this patent is extended or adjusted under 35 U.S.C. 154(b) by 0 days.

(21) Appl. No.: 10/348,679

(22) Filed: Jan. 22, 2003

(51) Int. Cl.$^7$ ................................................ B62B 1/24
(52) U.S. Cl. ............................. 280/47.31; 280/47.32; 298/3
(58) Field of Search ................................ 280/645, 653, 280/652, 659, 47.18, 47.3, 47.31, 47.32, 280/47.41, 78, 33.996; 298/2, 3, 10

(56) References Cited

U.S. PATENT DOCUMENTS

| | | | | | |
|---|---|---|---|---|---|
| 1,032,009 | A | * | 7/1912 | Long | 298/3 |
| 1,261,532 | A | * | 4/1918 | Hoe | 298/3 |
| 1,590,000 | A | * | 6/1926 | Trowe | 298/3 |
| 1,804,403 | A | * | 5/1931 | Dowling | 37/434 |
| 2,037,222 | A | * | 4/1936 | Farrar | 298/3 |
| 2,544,505 | A | * | 3/1951 | Kronhaus | 414/554 |
| 2,852,304 | A | * | 9/1958 | Harrison | 298/3 |
| 2,973,224 | A | * | 2/1961 | Wall | 298/3 |
| 3,092,418 | A | * | 6/1963 | Themascus | 298/3 |
| 4,270,786 | A | * | 6/1981 | Mattox | 298/3 |
| 4,471,996 | A | * | 9/1984 | Primeau | 298/3 |
| 4,789,171 | A | * | 12/1988 | Porter | 280/47.18 |
| 4,921,305 | A | * | 5/1990 | Steer | 298/3 |
| 5,121,970 | A | * | 6/1992 | Andersen | 298/3 |
| 5,350,030 | A | * | 9/1994 | Mawhinney et al. | 180/19.3 |
| 5,372,376 | A | * | 12/1994 | Pharaoh | 280/653 |
| 6,193,319 | B1 | * | 2/2001 | Kielinski | 298/2 |
| 6,390,496 | B1 | * | 5/2002 | Eicher | 280/653 |
| 6,446,989 | B1 | * | 9/2002 | Intengan | 280/47.34 |
| 2002/0113389 | A1 | * | 8/2002 | Robinson | 280/47.31 |
| 2004/0061372 | A1 | * | 4/2004 | Messinger-Rapport | 298/3 |

* cited by examiner

Primary Examiner—Christopher P. Ellis
Assistant Examiner—Jeffrey Restifo
(74) Attorney, Agent, or Firm—Philip M. Weiss; Weiss & Weiss

(57) ABSTRACT

The use of a pivotal coupling on a cart of the wheelbarrow type allows for a downwardly applied pressure to the user ends of the handles to tip the bucket to at least begin the dumping action of the cart. Following the initial downward pressure with the handles still elevationally displaced downward an upward lift applied to the user ends of the handles completes the dumping action of the cart. Use of multiple pivotal axises on the cart provide for an extremely efficient operation. Various enhancements are explained including locking of the orientation of the cart following the initial dump, wheel blocking to prevent rotation of the ground support wheel relative to the bucket during at least a portion of the final dumping action and stabilization enhancement to prevent lateral tipping of the cart during the final dumping action.

8 Claims, 6 Drawing Sheets

EASY DUMPING CART

BACKGROUND

1. Field of the Invention

Generally, the invention relates to carts capable of being manually manipulated by a person and manually dumped. More specifically, the invention relates to such carts which may be dumped utilizing a combination of a downwardly applied pressure on a handle assembly and an upwardly applied pressure on the handle assembly.

2. Description of the Prior Art

Numerous types of carts exist which have a wheel or wheels, a container and a handle assembly where the cart can be manually manipulated by a person and manually dumped. A classic example of such a cart is a wheelbarrow which typically has a single front wheel, opposing handles which extend from the front wheel rearward, support legs extending downward from the handles and a bucket fixedly attached to the top of the handles. Millions of such carts have been produced for domestic use in the United States. In use the wheelbarrow typically rests on the ground at the front wheel and the support legs when not being manipulated by a person. From this position the bucket of the wheelbarrow may be loaded. When the wheelbarrow is to be moved from one position to another the person grips the handles distal from the front wheel and raises the handles to raise the support legs off of the ground. At this point the wheelbarrow is supported by the front wheel and the person manipulating the handles. When a dumping of the contents of the bucket is desired, without regard for whether the support legs are in contact with the ground or elevated above the ground for movement of the wheelbarrow, the person raises the handles to angularly tip the wheelbarrow up. This operation is performed countless times each day by construction workers as well as casual users. Despite the fact that this operation is routinely performed it remains an awkward operation to perform. First the hands move upward while lifting the handles up in a pulling action then a transfer occurs where the person's grip on the handles shifts and then the person applies a pushing action upward to the handles. This operation is performed while balancing the weight of the wheelbarrow and the contents of the bucket across the opposing handles and on the single front wheel.

Various innovations have been made to wheelbarrow designs to make the above dumping operation more controllable. A first class of innovations involves increasing the stability of the front wheel by either providing for a wider wheel or providing for opposing spaced adjacent wheels. Another class of innovations involve providing unique angular arrangement of at least the grip portion of the handles. Another class of innovations is known in the art for a more controllable dumping which involve providing for a downward pressure to be applied to the handles to perform the dumping procedure while the support legs remain in contact with the ground during the entire dumping procedure. Two examples of such designs appear in U.S. Pat. No. 1,032,009 to Long in 1912 and U.S. Pat. No. 2,037,222 to Farrar in 1935. Both of these designs have leg supports which are fixedly positioned relative to their respective front wheels.

Various deficiencies exist with the known designs for carts of the wheelbarrow type. As can be seen various attempts have been made to provide for a more controllable dumping operation of wheelbarrows. These attempts have been less efficient than desired. As such, it may be appreciated that there continues to be a need for a cart design which provide for performance of a dumping operation which may be easily, safely and comfortably performed. The present invention substantially fulfills these needs.

SUMMARY

In view of the foregoing disadvantages inherent in the known types of carts, your applicant has devised a cart for easy dumping which utilizes a downward pressure applied by a user. The cart has a handle assembly, a wheel assembly, a ground contacting assembly and a pivotal coupling. The handle assembly has a user manipulation end and a distal end. The wheel assembly has a ground support wheel which has a rotational axis. The wheel assembly also has a bucket fixedly positioned relative to the rotational axis of the ground support wheel. The ground contacting assembly contacts the ground while the cart is in a resting orientation and provides for a leveraging when the downward pressure is applied to the handle assembly at the user manipulation end. The pivotal coupling provides for a pivoting of the handle assembly relative to select portions of the cart to apply an upward pressure to the wheel assembly in close proximity to the bucket when the downward pressure is applied to the handle assembly at the user manipulation end. The upward pressure applied to the wheel assembly utilizes a cooperation between the ground contacting assembly and the pivotal coupling where the bucket is easily dumped forward away from the user manipulation end of the handle assembly.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a cart which may be dumped utilizing a combination of a downward push to the handle assembly followed by an upward lift to the handle assembly.

Other objects include;

a) to provide for the bucket of the cart to be in a tipped position following the initial downward push applied to the handle assembly.

b) to provide for a reduction in stress related injuries, including back injuries, which currently result from dumping operations of conventional fixed frame design wheelbarrows.

c) to provide for placement of a biasing point behind a center of balance plane of the bucket of the cart where relatively light downward pressure is required to be applied to the handle assembly to perform the initial dumping operation.

d) to provide for an initial placement of the bucket following the initial dumping operation which utilized the downward pressure where relatively light upward pressure is required to be applied to the handle assembly to perform the final dumping operation.

e) to provide for locking means to retain the cart in a dumping orientation while the upward pressure is applied to the handle assembly during performance of the final dumping operation.

f) to provide for wheel rotation blocking means to prevent rotation of the ground support wheel relative to the bucket at least during a portion of the final dumping operation.

g) to provide for the rotation axis of the ground support wheel to move toward the ground contact portion of the ground contacting assembly during at least a portion of the initial dumping operation when the downward pressure is applied to the handle assembly.

h) to provide for a single pivotal axis extending laterally across the cart to provide for the structural displacement during the initial dumping operation when the downward pressure is applied to the handle assembly.

i) to provide for two spaced pivotal axises each extending laterally across the cart to provide for the structural displacement during the initial dumping operation when the downward pressure is applied to the handle assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION

Figure 1:
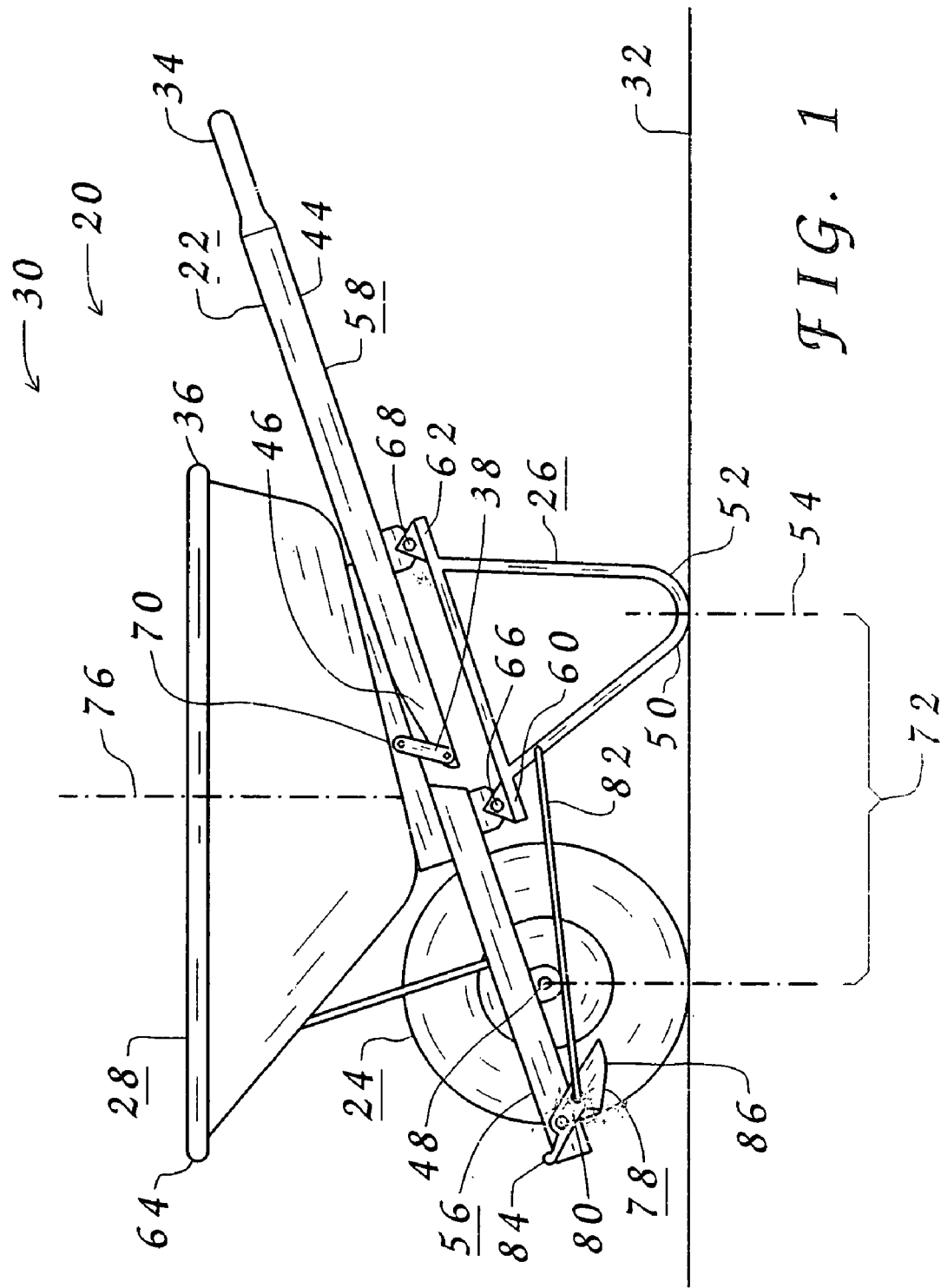
FIG. 1 is an elevational side view of a cart in a resting orientation.

Many different carts having features of the present invention are possible. The following description describes the preferred embodiment of select features of those carts and various combinations thereof. These features may be deployed in various combinations to arrive at various desired working configurations of carts.

Reference is hereafter made to the drawings where like reference numerals refer to like parts throughout the various views.

Carts having features of the present invention provide for an easy dumping of a load utilizing a downward pressure applied by a user to a handle assembly. The carts will have a handle assembly, a ground support wheel, a ground contacting assembly and a bucket. The carts will have a resting orientation where the cart is in a standard configuration and where loading of the cart may readily occur as conventionally known for standard carts. The cart will have a longitudinal length aligned with a straight line of travel of the cart. The cart will have a forward portion and rearward portion and opposing lateral sides. Suitable cross bracing at various positions on the cart, as conventionally known in the art, may be utilized to enhance a structural integrity of the cart.

FIG. 1 depicts a cart 20 having a handle assembly 22, a ground support wheel 24, a ground contacting assembly 26 and a bucket 28 and positioned in a resting orientation 30 on a ground surface 32.

A preferred method of use provides for a user to dump a cart using the steps of providing a cart having features of the present invention. Then positioning the cart in a starting position with the bucket generally level and the ground contacting assembly in contact with the ground and the ground support wheel in contact with the ground. Then applying a downward pressure to the user manipulation end of the handle assembly of the cart wherein the user manipulation end of the handle assembly moves downward and the bucket pivots upward at the rearward extremity relative to the ground contacting assembly until the locking means locks the handle assembly in the leveraged position relative to the ground contacting assembly. Then applying an upward pressure to the user manipulation end of the handle assembly of the cart wherein the bucket angularly tips up at the rearward extremity to a dumping orientation. Then moving the user manipulation end of the handle assembly of the cart downward to return the cart to the starting position by which point the locking means releases the handle assembly to return the handle assembly to the standard position from the leveraged position.

Figure 2:
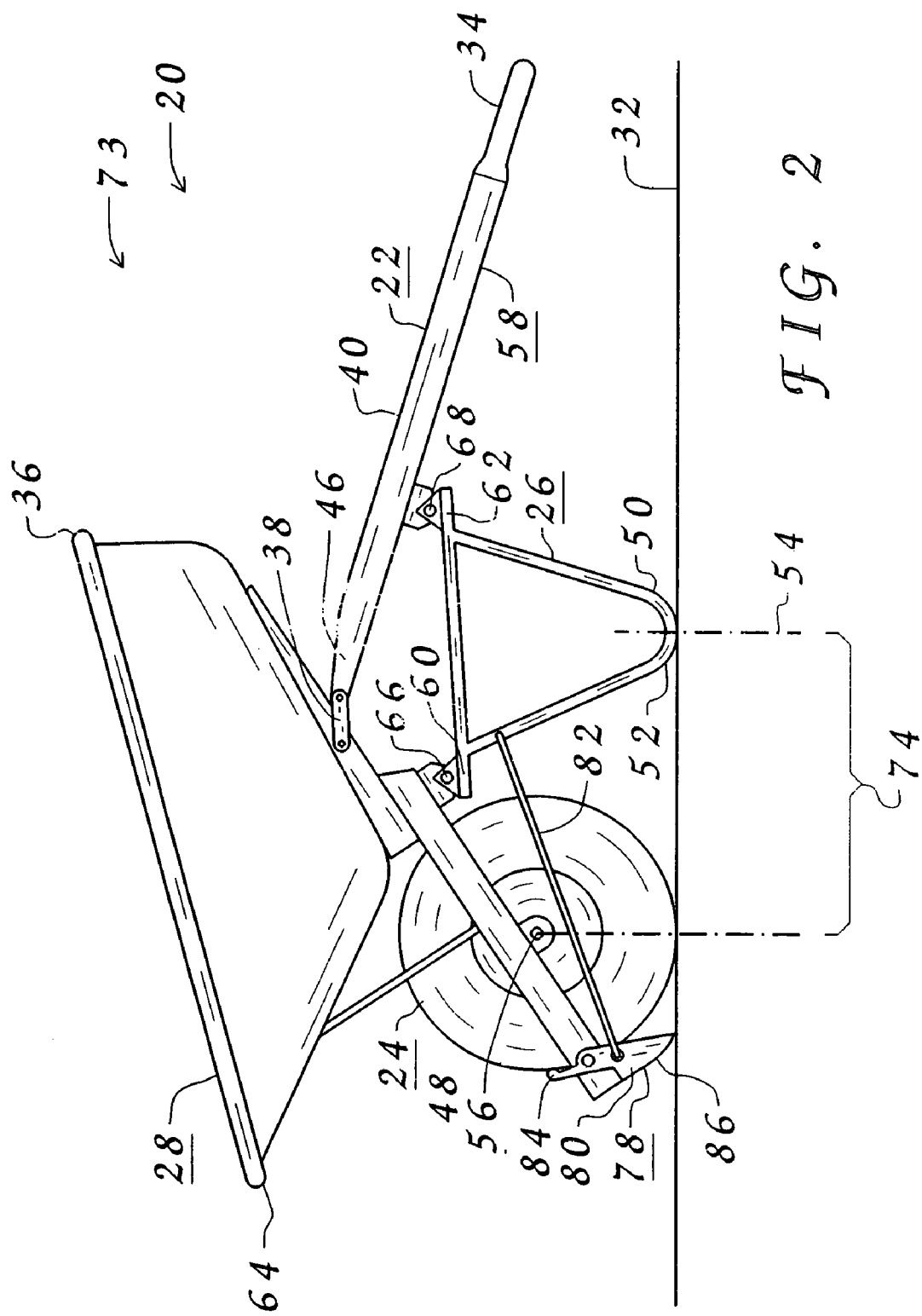
FIG. 2 is an elevational side view of the cart shown in FIG. 1 and in an initial dumping orientation.
Figure 3:
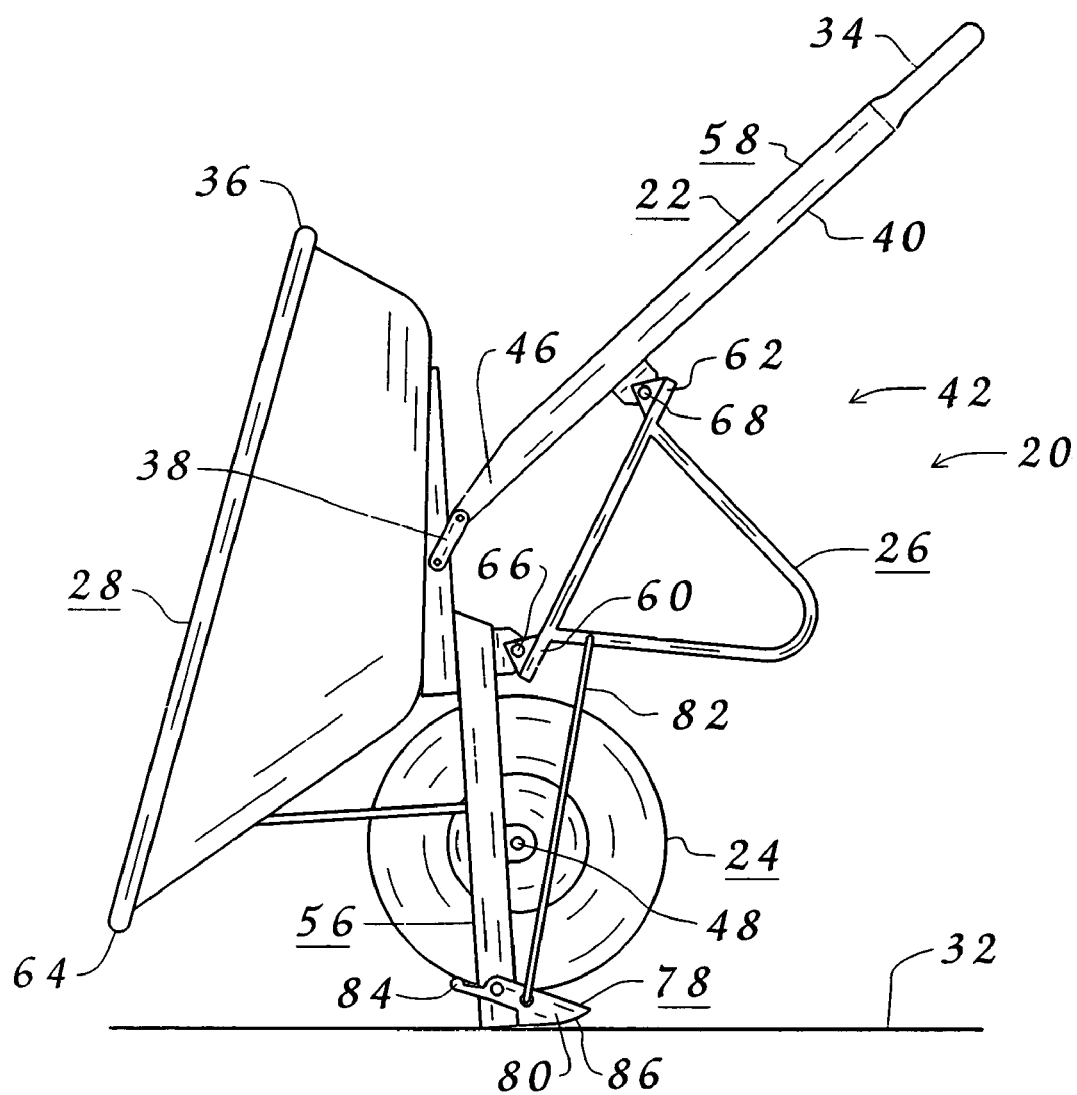
FIG. 3 is an elevational side view of the cart shown in FIG. 1 and FIG. 2 and in a final dumping orientation.

FIG. 1 through FIG. 3 depict various steps of use of cart 20. FIG. 1 depicts cart 20 positioned in a starting position with bucket 28 generally level and ground contacting assembly 26 and ground support wheel 24 in contact with ground surface 32. The change depicted from FIG. 1 to FIG. 2 depicts the change subsequent to the applying of a downward pressure to a user manipulation end 34 of handle assembly 22. User manipulation end 34 of handle assembly 22 has moved downward and bucket 28 has pivoted upward at a rearward extremity 36 relative to ground contacting assembly 26. An arcing coupling 38 has locked handle assembly 22 in a leveraged position 40 relative to ground contacting assembly 26. The change depicted from FIG. 2 to FIG. 3 depicts the change subsequent to applying an upward pressure to user manipulation end 34 of handle assembly 22. Bucket 28 has angularly tipped up at rearward extremity 36 to a final dumping orientation 42. During at least a portion of this movement arcing coupling 38 has retained handle assembly 22 in leveraged position 40 relative to ground contacting assembly 26. The change depicted from FIG. 3 to FIG. 1 depicts the change subsequent to moving user manipulation end 34 of handle assembly 22 downward to return cart 20 to the starting position. By this point arcing coupling 38 has released handle assembly 22 to return handle assembly 22 to a standard position 44 from leveraged position 40.

The handle assembly will have a user manipulation end for manipulation by the user and a distal end opposing the user manipulation end. The handle assembly has a standard position corresponding to the cart's resting orientation. The handle assembly may take many forms with a preferred arrangement of a pair of symmetrically disposed opposing arms positioned on opposing lateral sides of the cart.

FIG. 1 depicts handle assembly 22 having user manipulation end 34 and a distal end 46 opposing user manipulation end 34. Handle assembly 22 is depicted in standard position 44 corresponding to resting orientation 30.

The ground support wheel will be in contact with the ground surface during much of the use of the cart. The ground support wheel will have a rotational axis about which it will rotate. While a single ground support wheel is preferred it is possible to provide for multiple ground support wheels adjacently positioned and sharing a common rotational axis.

FIG. 1 depicts ground support wheel 24 in contact with ground surface 32. Ground support wheel 24 has a rotational axis 48 about which it may rotate.

The ground contacting assembly will contact the ground while the cart is in the resting orientation and will provide for leveraging means when the downward pressure is applied to the handle assembly at the user manipulation end. The ground contacting assembly will have a ground contact portion which makes contact with the ground surface during certain operations of the cart. The ground contacting assembly may take many forms but preferably will distribute the weight of the cart, and any load positioned thereon, to, or toward, the opposing lateral sides of the cart while the cart is in the resting orientation, as conventionally known for wheelbarrow type carts. The ground contact portion preferably will have a curvature thereon where a rolling contact with the ground surface will occur during the initial dumping operation. When the curvature is provided a pressure bearing axis of the ground contacting assembly typically will move along the ground contact portion when the downward pressure is applied to the handle assembly at the user manipulation end.

In certain embodiments the ground contacting assembly will take the form of a coupling assembly having a ground contact portion which preferably will also be laterally distributed across the cart. The coupling assembly will span from the forward portion of the cart having the ground support wheel and the bucket to the rearward portion of the cart having the handle assembly. The ground contacting assembly may have a first connection portion and a second connection portion with the first connection portion connected to the forward portion, the wheel assembly, and the second connection portion connected to the rearward portion, the handle assembly. The coupling assembly may be pivotally attached to the forward portion of the cart and pivotally attached to the rearward portion of the cart. Alternatively, the coupling assembly may be pivotally attached to either the forward portion or rearward portion and fixedly attached to the opposing portion. The ground contacting assembly may extend from the rearward portion having the handle assembly and not contact the forward portion of the cart.

As shown in FIG. 1 and FIG. 2 ground contacting assembly 26 contacts ground surface 32 and provides for a leveraging action to be applied by distal end 46 of handle assembly 22 relative to bucket 28 when the downward pressure is applied to user manipulation end 34. Ground contacting assembly 26 has a ground contact portion 50 which makes contact with ground surface 32. Ground contact portion 50 has a curvature 52 thereto which rolls along ground surface 32 during the initial dumping operation as depicted from FIG. 1 to FIG. 2. A pressure bearing axis 54 moves during the movement of ground contacting assembly 26. Ground contacting assembly 26 is a coupling assembly which spans from a forward portion 56 to a rearward portion 58. Forward portion 56 has ground support wheel 24 and bucket 28 while rearward portion 58 has handle assembly 22. Forward portion 56 is also known as a wheel assembly. Ground contacting assembly 26 has a first connection portion 60 and a second connection portion 62. First connection portion 60 and second connection portion 62 are pivotally attached to forward portion 56 and rearward portion 58 respectively.

The bucket will be attached to the cart relative to the ground support wheel. Preferably the bucket will be fixedly positioned on the cart relative to the rotational axis of the ground support wheel. The bucket has a rearward extremity distal from the ground support wheel and a forward extremity in closer proximity to the ground support wheel.

FIG. 1 depicts bucket 28 fixedly attached to cart 20 relative to rotational axis 48 of ground support wheel 24. Bucket 28 has rearward extremity 36 and a forward extremity 64.

It is possible to provide for the bucket to pivot from a position offset from the rotational axis of the ground support wheel to provide for the bucket to contact the ground support wheel to prevent rotation thereof at select times. Preferably the forward portion of the cart will form a wheel assembly having the ground support wheel and the bucket fixedly positioned thereon.

At least one pivotal coupling will provide for a pivoting of the handle assembly relative to select portions of the cart. The pivotal coupling will provide for a pivotal axis which laterally extends across the cart. Many structural elements may be utilized to provide for such couplings with at least two (2) laterally spaced elements preferably being deployed. In a most preferred embodiment two (2) such pivotal axises are provided in spaced relationship along the longitudinal length of the cart. In these cases the coupling assembly may be provided with a first pivotal axis connecting the coupling assembly to the forward portion, the wheel assembly, and with a second pivotal axis connecting the coupling assembly to the rearward portion, the handle assembly, to provide for a pivoting of the handle assembly relative to the remainder of the cart.

FIG. 1 through FIG. 3 depict a pivotal coupling 66 between ground contacting assembly 26 and forward portion 56 and a pivotal coupling 68 between ground contacting assembly 26 and rearward portion 58.

Biasing means will provide for the handle assembly, in close proximity to the distal end, to apply, or cause to be applied, an upward pressure relative to the bucket when the downward pressure is applied to the handle assembly at the user manipulation end. The leveraging provides for the bucket to easily dump forward away from the user manipulation end of the handle assembly. The biasing means will act with the ground contact portion of the ground contacting assembly or coupling assembly to provide the desired leverage relative to the bucket to cause the initial tipping of the bucket where the elevational relationship of the rearward extremity of the bucket moves upward relative to the forward extremity of the bucket. The biasing means may employ many different structural arrangements. A sliding engagement and an arcing engagement are two of the preferred structural arrangements. When a sliding engagement is utilized a track may restrict moving components to a desired path.

FIG. 1 through FIG. 3 depict handle assembly 22 applying an upward pressure 70, see FIG. 1, relative to bucket 28 through arcing coupling 38.

Locking means provides for a locking of the handle assembly relative to the bucket in a leveraged position subsequent to the initial dumping action resulting from the application of the downward pressure to the user manipulation end of the handle assembly. Many structural arrangements may be used to provide the desired locking of the handle assembly in the elevationally displaced position. The locking means provides for selectively retaining the forward portion, the wheel assembly, in a dumping orientation relative to the rearward portion, the handle assembly, subsequent to the downward pressure being applied to the handle assembly at the user manipulation end sufficient to displace the forward portion, the wheel assembly, including the bucket to the dumping orientation. Means may be provided to lock the cart in the resting orientation if desired such as where conventional use is desired or during transport.

FIG. 1 through FIG. 3 depict arcing coupling 38 which acts to lock handle assembly 22 in leveraged position 40 subsequent to the initial dumping action, see change from FIG. 1 to FIG. 2. This locking allows for handle assembly 22 to remain in leveraged position 40 during the final dumping action, see change from FIG. 2 to FIG. 3.

The rotational axis of the ground support wheel has a resting spacing relative to the ground contact portion of the ground contacting assembly at the ground surface when the cart is in the resting orientation. In use carts having features of the present invention will operate based on one of two general principles. Under the first principle structures of the cart will provide for the ground contacting assembly to remain at a uniform spacing relative to the rotational axis of the ground support wheel during the initial dumping operation. Under the second principle structures of the cart will provide for the rotational axis of the ground support wheel to move toward the ground contacting assembly during the initial dumping operation. In this second more preferred arrangement the rotational axis of the ground support wheel has a dumping spacing relative to the ground contact portion of the ground contacting assembly subsequent to the downward pressure being applied to the handle assembly at the user manipulation end with the resting spacing greater than the dumping spacing.

FIG. 1 depicts a resting spacing 72 between rotational axis 48 and pressure bearing axis 54 of ground contact portion 50 while cart 20 is in resting orientation 30. FIG. 2 depicts a dumping spacing 74 between rotational axis 48 and pressure bearing axis 54 of ground contact portion 50 while cart 20 is in an initial dumping orientation 73. It being noted that resting spacing 72 is greater than dumping spacing 74.

The bucket will have a center of balance positioned somewhere between the ground support wheel and the user manipulation end of the handle assembly. The center of balance is loosely determined based upon a uniform distribution of a typical load as would most likely be carried by the respective cart. The handle assembly has a leveraging position distal from the user manipulation end where the leveraging position acts upon the bucket during the initial dumping operation. Preferably the leveraging position of the handle assembly acts upon the bucket rearward, or on the user manipulation end of the handle assembly, side of the center of balance of the bucket during the applying of the downward pressure to the user manipulation end of the handle assembly.

FIG. 1 depicts a center of balance 76 of bucket 28. Upward pressure 70 is applied rearward, toward handle assembly 22, of center of balance 76.

Ground support wheel rotation blocking means provides for preventing rotation of the ground support wheel relative to the bucket during the applying of the upward pressure to the user manipulation end of the handle assembly. The application of upward pressure to the user manipulation end of the handle assembly occurs subsequent to the application of the downward pressure of the initial dumping action. During the application of the upward pressure the bucket angularly tips up at the rearward extremity to the dumping orientation. The ground support wheel rotation blocking means acts to prevent the cart from rolling during a portion of the dumping operation. Many structures are known in the art to provide for such blocking. The blocking may act upon some portion of the actual wheel or may act upon the axle bearing the wheel. A separate dedicated blocking member may be employed or a pivotal contact of the bucket with the wheel may be employed.

FIG. 1 through FIG. 3 depict a ground support wheel rotation blocking assembly 78 having a wedge portion 80 and a deployment coupling 82. When cart is transferred from resting orientation 30, see FIG. 1, to initial dumping orientation 73, see FIG. 2, deployment coupling 82 causes a pivotal displacement of wedge portion 80. Wedge portion 80 has a wheel engagement portion 84 which does not interfere with rotation of ground support wheel 24 when cart 20 is in resting orientation 30, see FIG. 1. When cart 20 is transferred to initial dumping orientation 73, see FIG. 2, wheel engagement portion 84 engages ground support wheel 24 and prevents rotations thereof until cart 20 released from initial dumping orientation 73 to begin to return to resting orientation 30, see FIG. 1.

A stabilizing assembly may be positioned in close proximity to the ground support wheel to provide for contacting the ground surface in close proximity to the ground support wheel during some portion of the dumping procedure. Such an assembly may be employed to prevent the cart from rolling forward along the ground surface utilizing the ground support wheel and/or to laterally expand the contact area beyond that available by the ground support wheel to increase stability of the cart during the final dumping operation where the ground contacting assembly is raised off of the ground surface. Various arrangements may be employed including a fixed position arrangement. Preferably the stabilization assembly will provide for a ground contacting portion to be elevationally displaced at least when the cart is being moved about to prevent inadvertent contact with the ground.

Wedge portion 80 of ground support wheel rotation blocking assembly 78 also has a ground contact surface 86 which is deployed when cart is transferred from resting orientation 30, see FIG. 1, to initial dumping orientation 73, see FIG. 2. Ground contact surface 86 is disposed on opposing sides of ground support wheel 24 to stabilize cart 20 during the final dumping operation, see change from FIG. 2 to FIG. 3.

Figure 4:
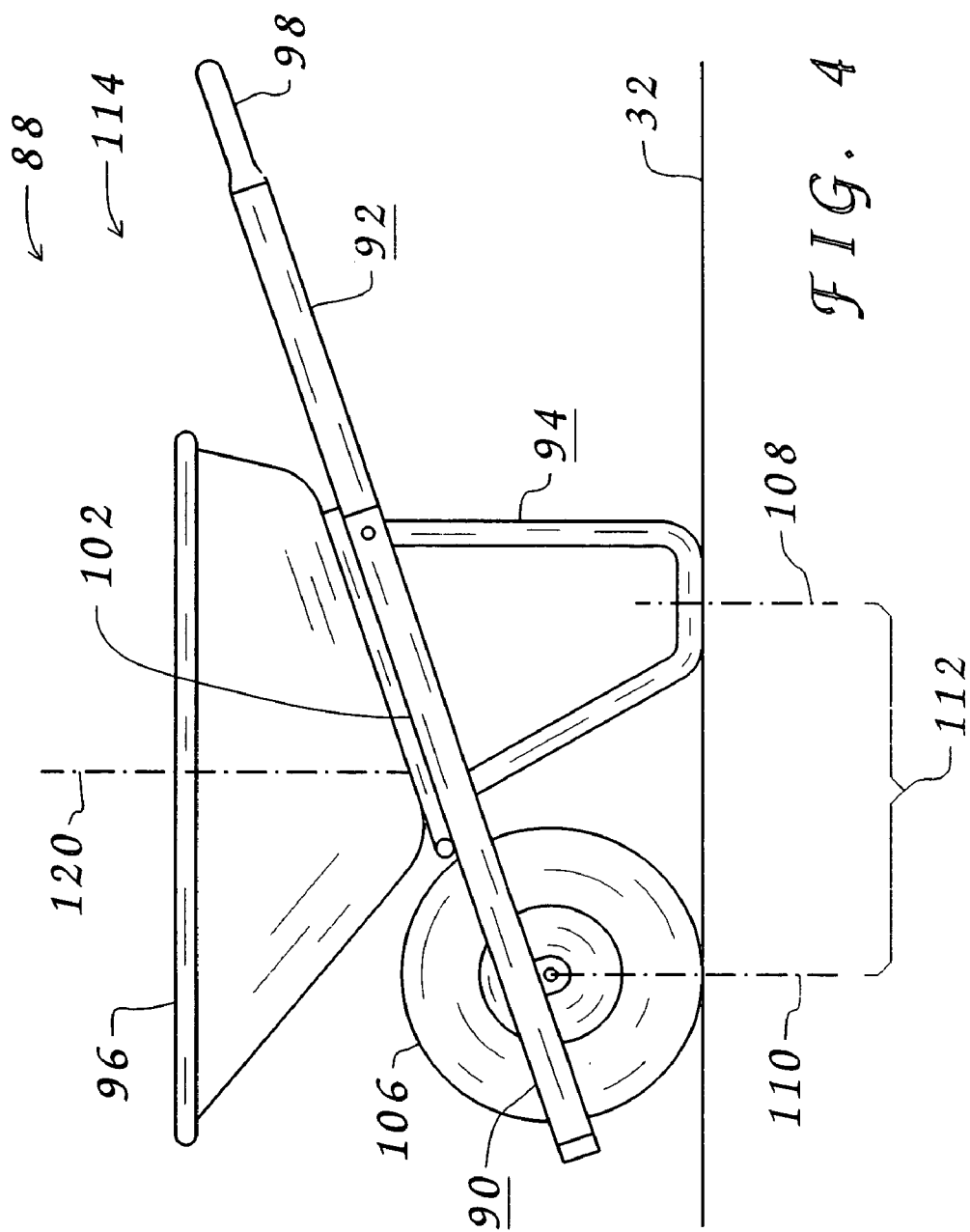
FIG. 4 is an elevational side view of another embodiment of a cart and in a resting orientation.
Figure 5:
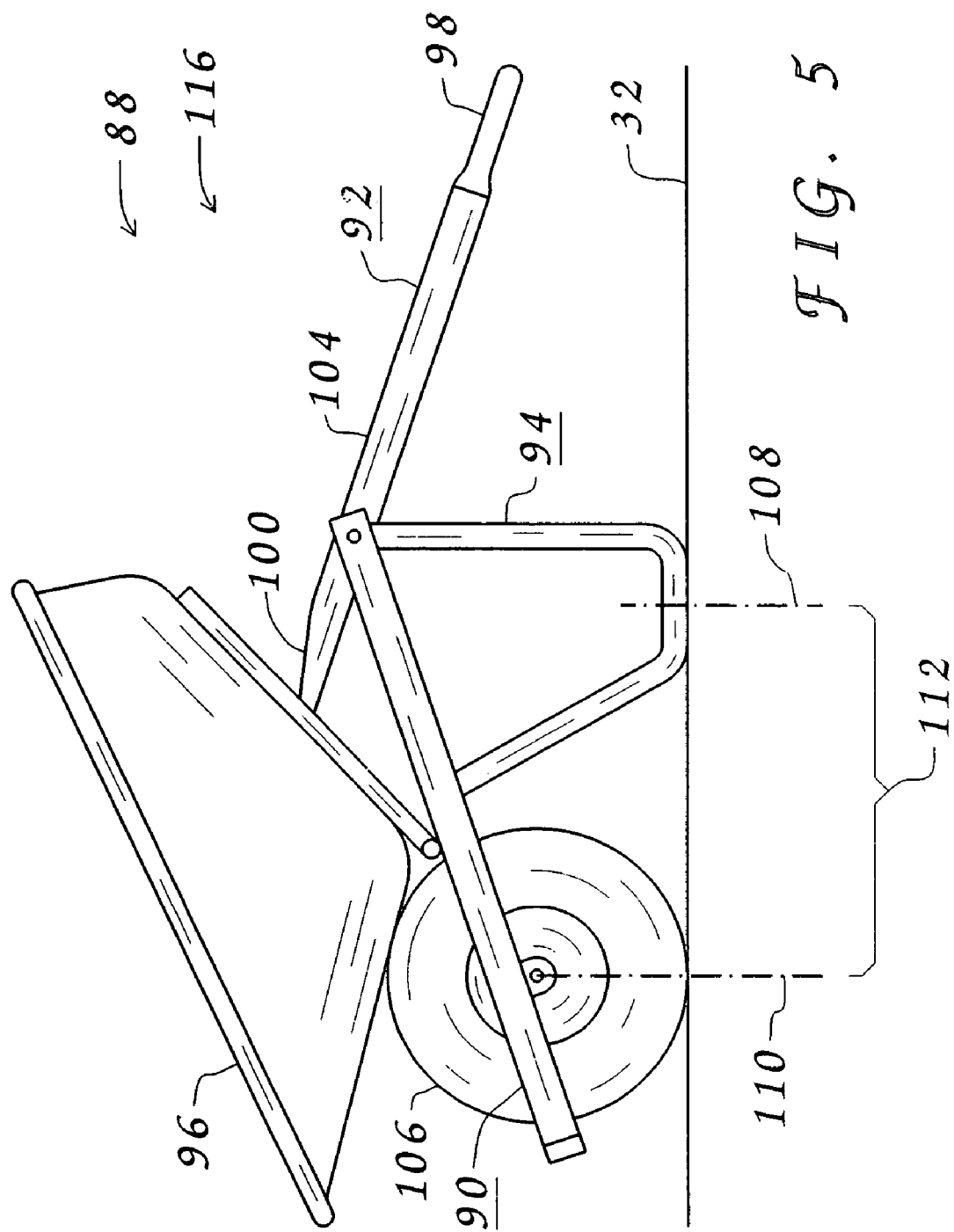
FIG. 5 is an elevational side view of the cart shown in FIG. 4 and in an initial dumping orientation.
Figure 6:
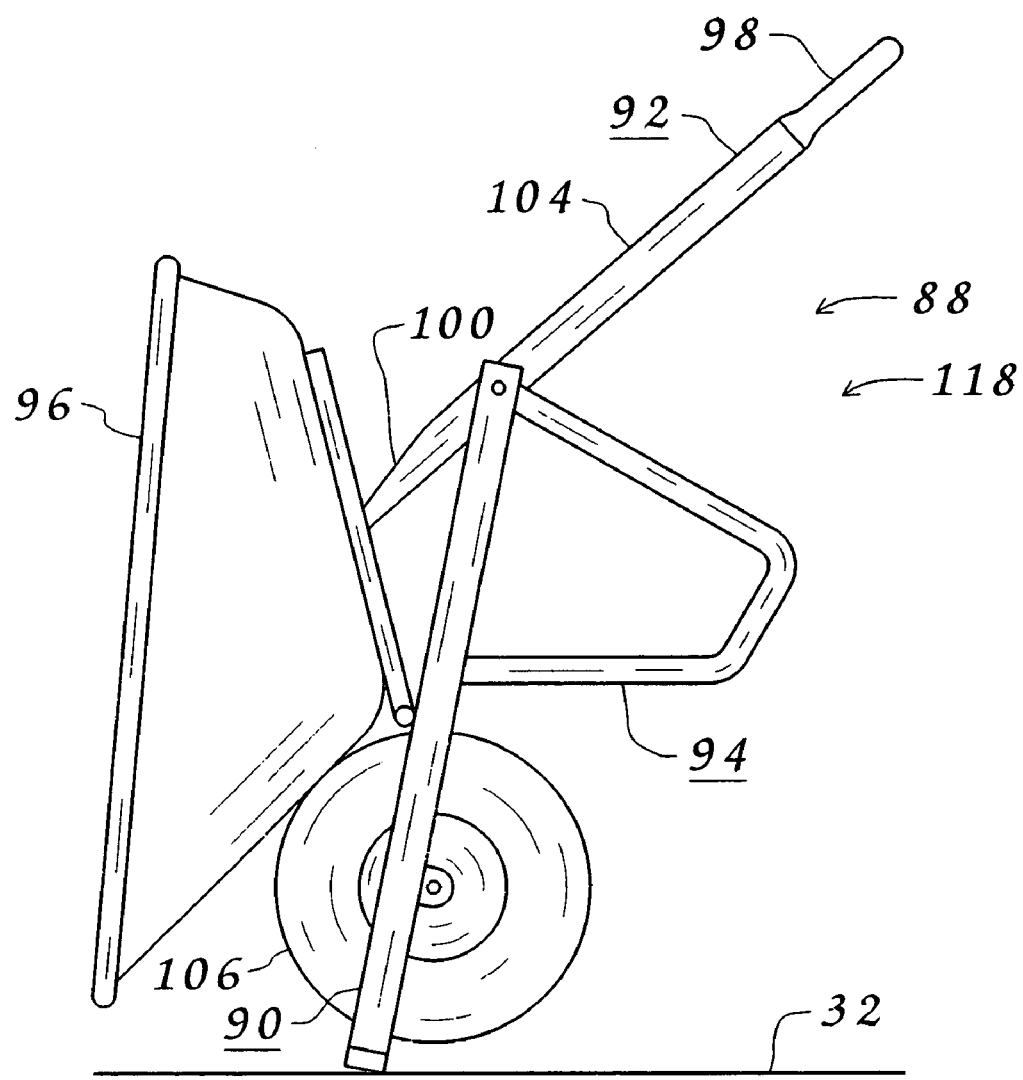
FIG. 6 is an elevational side view of the cart shown in FIG. 4 and FIG. 5 and in a final dumping orientation.

FIG. 4 through FIG. 6 depict a cart 88 having a wheel assembly 90 and a handle assembly 92. Wheel assembly 90 has a ground contacting assembly 94 attached thereto. Wheel assembly 90 also has a bucket 96 pivotally attached thereto. Handle assembly 92 is pivotally attached to wheel assembly 90 wherein a downward pressure on a user manipulation end 98 causes a pivotal displacement of a distal end 100. When handle assembly 92 is pivotally displaced distal end 100 applies an upward pressure 102, see FIG. 4, relative to bucket 96 to tip bucket 96 upward. During such displacement distal end 100 engages a slot, not shown, and locks in a leveraged position 104. While locked in leveraged position 104 bucket 96 bindingly engages a ground support wheel 106 to prevent rotation thereof. Ground contacting assembly 94 has a pressure bearing axis 108 relative to ground surface 32. Ground support wheel 106 has an axis of contact 110 relative to ground surface 32. Pressure bearing axis 108 and axis of contact 110 have a spacing 112 which remain stable during the pivotal displacement of bucket 96, see FIG. 4 and FIG. 5. FIG. 4 depicts cart 88 in a resting orientation 114. FIG. 5 depicts cart 88 in an initial dumping orientation 116. FIG. 6 depicts cart 88 in a final dumping orientation 118. Bucket 96 has a center of balance 120, see FIG. 1, with upward pressure 102 being applied rearward from center of balance 120.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for a user to dump a cart comprising the steps of:
   a) providing the cart with:
      1) a handle assembly having a user manipulation end for manipulation by the user, the handle assembly having a standard position;
      2) a ground support wheel;
      3) a ground contacting assembly;
      4) a bucket attached relative to the ground support wheel, the bucket having a rearward extremity and a forward extremity;
      5) locking means to provide for locking the handle assembly relative to the bucket in a leveraged position;
   b) positioning the cart in a starting position with the bucket generally level and the ground contacting assembly in contact with the ground and the ground support wheel in contact with the ground, then;
   c) applying a downward pressure to the user manipulation end of the handle assembly of the cart wherein the user manipulation end of the handle assembly moves downward and the bucket pivots upward at the rearward extremity relative to the ground contacting assembly until the locking means locks the handle assembly in the leveraged position relative to the ground contacting assembly, then;
   d) applying an upward pressure to the user manipulation end of the handle assembly of the cart wherein the bucket angularly tips up at the rearward extremity to a dumping orientation, then;
   e) moving the user manipulation end of the handle assembly of the cart downward to return the cart to the starting position by which point the locking means has released the handle assembly to return the handle assembly to the standard position from the leveraged position;
   wherein during the applying of the downward pressure to the user manipulation end of the handle assembly the ground support wheel moves toward the ground contacting assembly.

2. A method for a user to dump a cart comprising the steps of:
   a) providing the cart with:
      1) a handle assembly having a user manipulation end for manipulation by the user, the handle assembly having a standard position;
      2) a ground support wheel;
      3) a ground contacting assembly;
      4) a bucket attached relative to the ground support wheel, the bucket having a rearward extremity and a forward extremity;
      5) locking means to provide for locking the handle assembly relative to the bucket in a leveraged position;
   b) positioning the cart in a starting position with the bucket generally level and the ground contacting assembly in contact with the ground and the ground support wheel in contact with the ground, then;
   c) applying a downward pressure to the user manipulation end of the handle assembly of the cart wherein the user manipulation end of the handle assembly moves downward and the bucket pivots upward at the rearward extremity relative to the ground contacting assembly until the locking means locks the handle assembly in the leveraged position relative to the ground contacting assembly, then;
   d) applying an upward pressure to the user manipulation end of the handle assembly of the cart wherein the bucket angularly tips up at the rearward extremity to a dumping orientation, then;
   e) moving the user manipulation end of the handle assembly of the cart downward to return the cart to the starting position by which point the locking means has released the handle assembly to return the handle assembly to the standard position from the leveraged position;
   wherein the provided cart further comprises ground support wheel rotation blocking means to provide for preventing rotation of the ground support wheel relative to the bucket during the applying of the upward pressure to the user manipulation end of the handle assembly while the bucket angularly tips up at the rearward extremity to the dumping orientation.

3. A cart for easy dumping utilizing a downward pressure applied by a user, the cart comprising:
   a) a handle assembly having a user manipulation end and a distal end;
   b) a wheel assembly having a ground support wheel and a bucket, the ground support wheel having a rotational axis, the bucket fixedly positioned on the wheel assembly relative to the rotational axis of the ground support wheel;
   c) a coupling assembly having a ground contact portion to contact the ground while the cart is in a resting orientation and to provide for leveraging means when the downward pressure is applied to the handle assembly at the user manipulation end;
   d) a first pivotal coupling between the coupling assembly and the handle assembly;

e) a second pivotal coupling between the coupling assembly and the wheel assembly, the second pivotal coupling fixedly spaced from the rotational axis of the ground support wheel of the wheel assembly;

f) linking means to provide for the handle assembly in close proximity to the distal end to apply an upward pressure to the wheel assembly in close proximity to the bucket when the downward pressure is applied to the handle assembly at the user manipulation end utilizing a cooperation between the ground contact portion of the coupling assembly, the first pivotal coupling and the second pivotal coupling wherein the bucket is easily dumped forward away from the user manipulation end of the handle assembly.

4. The cart defined in claim 3 wherein the rotational axis of the ground support wheel of the wheel assembly has a resting spacing relative to the ground contact portion of the coupling assembly when the cart is in the resting orientation and wherein the rotational axis of the ground support wheel of the wheel assembly has a dumping spacing relative to the ground contact portion of the coupling assembly subsequent to the downward pressure being applied to the handle assembly at the user manipulation end and wherein the resting spacing is greater than the dumping spacing.

5. The cart defined in claim 3 wherein the linking means further comprises a sliding engagement between the handle assembly and the wheel assembly.

6. The cart defined in claim 3 wherein the linking means further comprises an arcing engagement between the handle assembly and the wheel assembly.

7. The cart defined in claim 3 further comprising ground support wheel rotation blocking means to provide for preventing rotation of the ground support wheel relative to the bucket during at least a portion of a dumping procedure.

8. The cart defined in claim 3 further comprising locking means to provide for selectively retaining the wheel assembly in a dumping orientation relative to the handle assembly subsequent to the linking means applying the upward pressure to the wheel assembly sufficient to displace the wheel assembly including the bucket to a dumping orientation.

* * * * *